(12) United States Patent
Chen

(10) Patent No.: US 7,151,356 B1
(45) Date of Patent: Dec. 19, 2006

(54) RETRACTABLE CORD POWER ADAPTER AND BATTERY PACK

(76) Inventor: Jeffrey Ganping Chen, 101 Citadel Pass Crescent, Northwest Calgary, Alberta (CA) T3G 3V2

( * ) Notice: Subject to any disclaimer, the term of this patent is extended or adjusted under 35 U.S.C. 154(b) by 321 days.

(21) Appl. No.: 10/812,320

(22) Filed: Mar. 29, 2004

(51) Int. Cl.
  *H02J 7/00* (2006.01)
  *H02J 7/02* (2006.01)
(52) U.S. Cl. .................. 320/107; 320/111; 320/114
(58) Field of Classification Search .............. 320/107, 320/110
  See application file for complete search history.

(56) References Cited

U.S. PATENT DOCUMENTS

| | | | | |
|---|---|---|---|---|
| 5,094,396 A | * | 3/1992 | Burke | 242/378.2 |
| 5,367,243 A | * | 11/1994 | Wells et al. | 320/105 |
| 5,847,541 A | * | 12/1998 | Hahn | 320/111 |
| 6,495,988 B1 | * | 12/2002 | Liao | 320/111 |
| 6,623,294 B1 | * | 9/2003 | Tse et al. | 439/501 |
| 6,977,482 B1 | * | 12/2005 | Popescu-Stanesti et al. | 320/116 |

* cited by examiner

*Primary Examiner*—Karl Easthom
*Assistant Examiner*—Richard V. Muralidar
(74) *Attorney, Agent, or Firm*—Michael I Kroll

(57) ABSTRACT

A power source having a housing is disclosed. A first power cord extends from the housing. The first power cord has a first connector positioned at a distal end thereof for selective connection to an external power source. A second power cord extends from the housing. The second power cord having a second connector positioned at a distal end thereof for selective connection to an electronic device. A power adapter is connected between the first and second power cord. Upon connecting the external power source, the power adapter detects the presence of and receives external power through the first power cord and transfers power to the electronic device through the second cord. The power adapter also retains a charge therein for providing power to the electronic device when no external power source is detected.

2 Claims, 9 Drawing Sheets

RETRACTABLE CORD POWER ADAPTER AND BATTERY PACK

BACKGROUND OF THE INVENTION

1. Field of the Invention

The present invention relates a power source, and more specifically, to a device for providing power to electronic devices having a recharging cell and a rechargeable power cell contained therein. The device includes retractable cords for connection to an AC power source and an electronic device for providing power thereto. The device can simultaneously provide power to an electronic device when connected to an AC power source and recharge the rechargeable power cell system via the recharging cell. Upon being disconnected from the AC power source, the device can continue to provide power to the electronic device using power stored in the rechargeable power cell.

2. Description of the Prior Art

Numerous other power sources exist in the prior art. Typical of these are U.S. Pat. Nos. 4,131,805; 4,229,686; 4,558,270; 5,150,032; 5,642,028; 5,689,412; 6,005,368; 6,160,378; 6,337,557; 6,459,175; and European Patent Number EP1128517. While these power sources may be suitable for the purposes for which they were designed, they would not be as suitable for the purposes of the present invention, as hereinafter described.

U.S. Pat. No. 4,131,805

Inventor: James Austin

Issued: Dec. 26, 1978

A line power cord voltage-magnitude adaptor is described herein. In a particular embodiment of the present invention, the power plug, line cord, and adaptor plug are pre-assembled as one component of the electrical equipment system; various voltage requirements can thus be prepared-for, whereby the equipment need not be altered, regardless of the eventual market for the equipment. The present invention can be used with virtually all kinds of electrical equipment energized by AC power, including computer systems.

U.S. Pat. No. 4,229,686

Inventor: Ferdinand H. Mullersman

Issued: Oct. 21, 1980

A charging system for rechargeable batteries of the 9 volt type includes a charger adapted to accept a plurality of cells of different sizes and electrical characteristics and an adapter module for mechanically and electrically interconnecting the charger to a 9 volt size battery.

U.S. Pat. No. 4,558,270

Inventor: James P. Liautand

Issued: Dec. 10, 1985

A battery charger system for supplying charging current to either a battery-powered transceiver or to the rechargeable battery pack of the transceiver includes a housing housing a receptacle for receiving the transceiver. Upon insertion of the transceiver into the receptacle an electric contact projecting from the bottom wall of the receptacle contacts the transceiver to establish electrical communication between the device and charging circuitry within the housing. When supplying charging current to the battery pack an adapter having a smaller receptacle is inserted into the receptacle to establish electrical communication between the contacts and the battery pack. A reciprocatively mounted actuator stem in the adapter housing enables actuation of a deep-discharge mode select switch through an aperture in the bottom wall of the receptacle.

U.S. Pat. No. 5,150,032

Inventor: Joseph K. P. Ho

Issued: Sep. 22, 1992

A combined charging circuit for a rechargeable battery and supply circuit has a battery for supplying power to an output supply and an adaptor to provide from a mains supply power at a voltage greater than the fully charged voltage of the battery, both to supply power to the output in place of the battery and to charge the battery. A buck convertor acts as switching charger for the battery and comprises a rectifier across the battery, and an inductor and an electronic switch in series with on another and with the supply from the battery to the output supply, the switch acting as the switching element of the switching charger when the adaptor is powered from the mains and as a low ON resistance power switch when the battery is supplying power to the output supply.

U.S. Pat. No. 5,642,028

Inventor: Minng-Hwa Tai

Issued: Jun. 23, 1997

A rechargeable battery assembly including a charging circuit and an electric plug assembly for connecting external power supply to the charging circuit, the charging circuit including an AC power input means to receive AC power supply, voltage dropping and power supply rectifying means connected to the AC power input means to drop AC power supply voltage and to change AC power supply into DC power supply, a battery, voltage detection and power supply control means, switch means connected between the voltage dropping and power supply rectifying means and controlled by the voltage detection and power supply control means to charge the battery.

U.S. Pat. No. 5,689,412

Inventor: James Chin-Ming Chen

Issued: Nov. 18, 1997

This invention is a multi-function power supply, i.e., a power-mate unit, for providing DC input to a portable electronic device, e.g., a notebook computer, operable with a rechargeable battery. The power-mate unit includes an AC plug for electrically connecting to an AC power source for receiving the AC input current. The power-mate unit further includes an AC/DC power supply for converting the AC input current to an external DC operation current suitable for operating the portable electronic device. The power-mate unit further includes a backup battery pack connected to the AC/DC power supply for receiving a backup battery charging current for charging the backup battery pack wherein the backup battery pack further providing a backup DC current to the portable electronic device. The power-mate unit further includes a backup battery monitoring and display for continuously monitoring a charge capacity of the backup battery pack and for displaying the charge capacity. And, the power-mate unit further includes an electronic device plug-in jack for electrically connecting the power-mate unit to the electronic device for providing the external DC operation current and the backup DC current to the electronic device.

U.S. Pat. No. 6,005,368

Inventor: Robert C. Frame

Issued: Dec. 21, 1999

A portable computer and docking station combination, comprising first and second batteries and first and second battery charging circuit portions, with automatic sequencing of charging between the batteries. The system includes means for charging a first battery based on an amount of current flowing into the computer circuitry, and means for charging a second battery based on an amount of current flowing into the first battery and into the computer circuitry.

U.S. Pat. No. 6,160,378

Inventor: Jacques H. Helot

Issued: Dec. 12, 2000

A battery charger utilizes detachable mechanical adapters, so that the battery charger can operate as a single battery charger or a dual battery charger. The detachable mechanical adapters are battery holders to connect a battery to the battery charger for recharging. Preferably, the battery charger is designed to charge one or two depleted notebook batteries. In the preferred embodiment, the battery charger also operates as an AC/DC converter to provide operating DC from AC, which is derived from AC received from an external source, to a notebook computer that is coupled to the battery charger. The battery charger includes an AC/DC adapter and a charging unit. The charging unit of the battery charger includes a central module and two detachable mechanical adapters. The central module of the charging unit contains battery-charging circuitry that provides the charging current from the received DC to the detachable mechanical adapters. The charging current is used to recharge any notebook batteries that are held by the detachable mechanical adapters. The central module includes two fold-out connectors that can be utilized to physically attach one or both mechanical adapters to the central module. In a first embodiment, the battery compartments of the mechanical adapters are designed to hold a particular type of notebook batteries having a fixed thickness. In a second embodiment, the battery compartments of the mechanical adapters are designed to hold one of two types of notebook batteries having different thicknesses.

U.S. Pat. No. 6,337,557

Inventor: Barry K. Kates

Issued: Jan. 8, 2002

An external universal battery charging apparatus which can include external universal battery charger circuitry having at least one universal battery charger circuitry input and at least one universal battery charger circuitry output. The universal battery charger circuitry output can include at least one battery charger output, which itself can include at least one universal battery connector and at least one universal battery charger cable. The at least one universal battery charger circuitry output can include at least one adapter pass through output, which itself can include at least one connector adapted to operably connect to an electronic device. The external universal battery charger circuitry can include at least one battery recognition and parameter adjustment circuit, battery current parameter adjustment circuit, charged voltage parameter adjustment circuit, and maximum power draw parameter adjustment circuit. The external universal battery charging apparatus can include a maximum rated power supply determination unit. The method can include detecting a battery, identifying characteristics of the battery, and adjusting at least one parameter in universal battery charger circuitry in response to the characteristics of the battery such that optimum battery charging is achieved.

U.S. Pat. No. 6,459,175

Inventor: Patrick H. Potega

Issued: Oct. 1, 2002

A power supply detects power requirements of an electrical device and configures itself to provide the correct power to the device. By using a connector that isolates the device from its battery, the power supply can provide power to the device, recharge the battery, recharge the battery while at the same time providing power to the device, or provide power to the device while preventing the battery from being recharged. A switch used with the connector creates various circuits and is controllable by the power supply, the electrical device, by signals from the electrical device, or by a third device. The power supply may provide power to a plurality of devices and may be used with other power supplies to form a power grid. A master control unit receives inputs from each of the power supplies and controls the delivery and supply of power being the power supplies.

European Patent Number EP1128517

Inventor: Kazuyuki Sakakibara

Issued: Aug. 29, 2001

Control portion 26 of battery charger 10 controls power source circuit 24 upon receipt of instructions from control portion 41 of adapter 30. Based upon these instructions, adapter 30 enables charging operations for battery pack 50B that does not have a memory storing charging parameters and/or information. Moreover, battery charger 10 also may be designed to charge a battery pack 50B even though battery charger was not originally designed to charge battery pack 50B. Adapter 30 also may enable charging operations for battery pack 50 that contains memory 61 storing charging parameters and/or battery identification information. In this case, adapter 30 reads information stored in memory 61 and generates optimal charging instructions based upon a charging program stored in control portion 41 (FIG. 1).

SUMMARY OF THE PRESENT INVENTION

The present invention relates a power source, and more specifically, to a device for providing power to electronic devices having a recharging cell and a rechargeable power cell contained therein. The device includes retractable cords for connection to an AC power source and an electronic device for providing power thereto. The device can simultaneously provide power to an electronic device when connected to an AC power source and recharge the rechargeable power cell system via the recharging cell. Upon being disconnected from the AC power source, the device can continue to provide power to the electronic device using power stored in the rechargeable power cell.

A primary object of the present invention is to provide a power source that overcomes the shortcomings of the prior art.

Another, secondary object of the present invention is to provide a power source that includes a rechargeable power cell which is charged via a charging cell.

Another object of the present invention is to provide a power source that includes an AC to DC power converter.

Still another object of the present invention is to provide a power source including first cord for connecting the device to an AC power source.

A further object of the present invention is to provide a power source including a second cord for connection the device to an electronic device.

Still a further object of the present invention is to provide a power source for providing DC power to an electronic device.

An even further object of the present invention is to provide a power source wherein the first and second cords are retractable.

Still a further object of the present invention is to provide a power source that simultaneously provides power to an electronic device and recharges the rechargeable power cell.

A further object of the present invention is to provide a power source for providing power to an electronic device without the power source being connected to an AC power source.

Still a further object of the present invention is to provide a power source wherein upon being disconnected from the AC power source, the rechargeable power cell provides power to an electronic device connected thereto.

Another object of the present invention is to provide a power source for providing power to an electronic device including at least one of a cell phone, a laptop computer, a printer, a digital camera, a portable CD player, a minidisc player, a personal digital assistant, and a voice recorder.

A further object of the present invention is to provide a power source wherein only one of either the first or second cords are retractable.

Still another object of the present invention is to provide a power source wherein the non-retractable cord has a fixed length.

Yet another object of the present invention is to provide a power source that is simple and easy to use.

Still yet another object of the present invention is to provide a power source device that is inexpensive to manufacture and operate.

Additional objects of the present invention will appear as the description proceeds.

The present invention overcomes the shortcomings of the prior art by providing a device for providing power to electronic devices having a recharging cell and a rechargeable power cell contained therein. The device includes retractable cords for connection to an AC power source and an electronic device for providing power thereto. The device can simultaneously provide power to an electronic device when connected to an AC power source as well as recharge the rechargeable power cell system via the recharging cell. Upon being disconnected from the AC power source, the device can continue to provide power to the electronic device using power stored in the rechargeable power cell.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
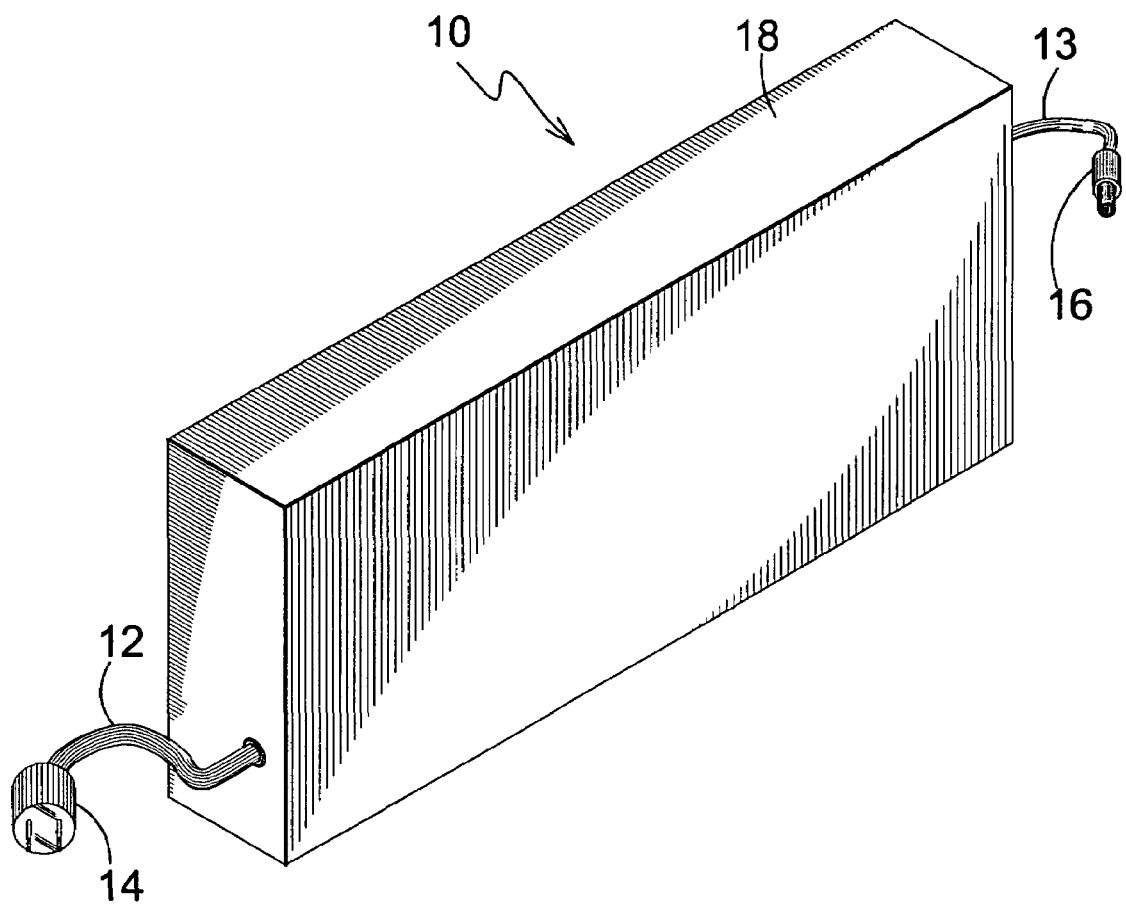
FIG. 1 is a perspective view of the power source of the present invention.

Turning now descriptively to the drawings, in which similar reference characters denote similar elements throughout the several views, the Figures illustrate the power source of the present invention. With regard to the reference numerals used, the following numbering is used throughout the various drawing Figures.

10 power source of the present invention
12 first cord
13 second cord
14 first connector
16 second connector
18 housing
19 first recess
20 first channel
21 second recess
22 second channel
24 first retracting mechanism
26 second retracting mechanism
28 external AC power source
30 AC/DC converter
32 power adapter
34 charging cell
36 rechargeable power cell
38 switch
40 electronic device

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 9 illustrate a power source of the present invention indicated generally by the numeral 10.

FIG. 1 is a perspective view of the power source 10 of the present invention. The power source 10 includes a housing 18. A first cord 12 having a first connector 14 positioned at a distal end thereof extends from the housing 18. Preferably, the first connector 14 is an AC power adapter for insertion into a standard AC power outlet. The power source 10 further includes a second cord 13 having a second connector 16 positioned at a distal end thereof extending from the housing 18. The second connector 16 is a standard plug that is able to be received by an electronic device that requires power. Additionally, the present invention may include a plurality of adapters (not shown) further connected to the second connector 16 so as to enable the power source 10 to be selectively connected to any electronic device requiring an external power source. Furthermore, the cords 12, 13 having connectors 14 and 16 respectively, are described for purposes of example only and either cord may have either connector positioned at a distal end thereof.

As will be discussed hereinafter with specific reference to FIGS. 6–9, the power source 10 includes a rechargeable power cell positioned therein. Thus, when the first connector 14 is connected to an AC outlet, the power source 10 is able to selectively charge the rechargeable power cell while simultaneously providing power to an electronic device connected to the second connector 16. The rechargeable power cell is able to selectively provide power to the electronic device connected to connector 16 even after the first connector is removed from the AC outlet.

Figure 2:
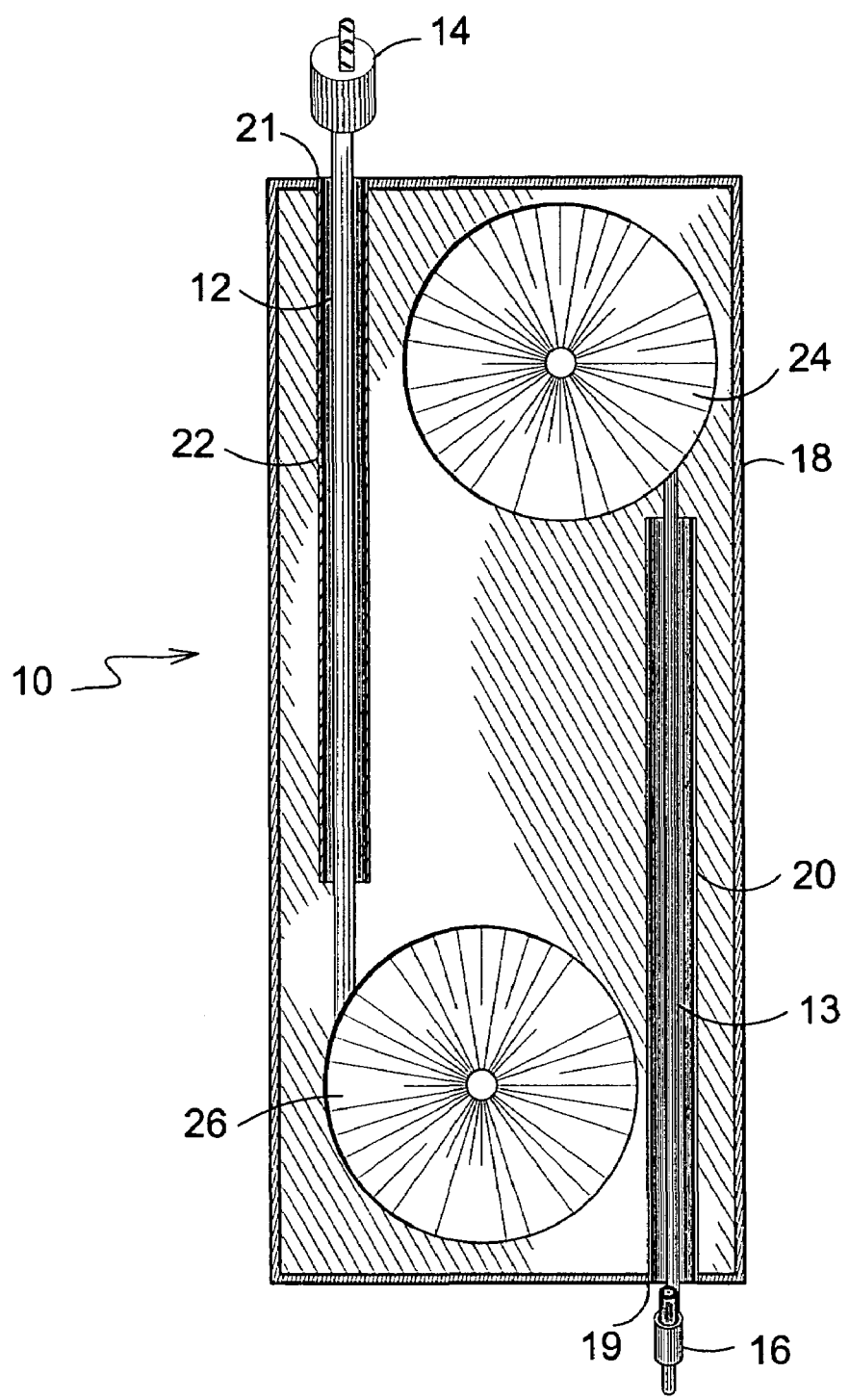
FIG. 2 is a cut away view of the power source of the present invention showing the cords as retractable.

FIG. 2 is a cut away view of the power source of the present invention showing the cords as retractable. The power source 10 includes the housing 18. The first cord 12 having the first connector 14 positioned at a distal end thereof extends from the housing 18. Preferably, the first connector 14 is an AC power adapter for insertion into a standard AC power outlet. The power source 10 further includes the second cord 13 having the second connector 16 positioned at a distal end thereof extending from the housing 18. The second connector 16 is a standard plug that is able to be received by an electronic device that requires power. Additionally, the present invention may include a plurality of adapters (not shown) further connected to the second connector 16 so as to enable the power source 10 to be selectively connected to any electronic device requiring an external power source. Furthermore, the cords 12, 13 having connectors 14 and 16 respectively, are described for purposes of example only and either cord may have either connector positioned at a distal end thereof.

As shown in FIG. 2, the housing includes a first channel 20 through which the first cord 12 extends along the length thereof. At one end of the first channel 20 is a first recess 19 which extends through the housing 18. The first cord 12 further extends through the first recess 19 outwardly from the housing. Positioned at the end of the first channel 20 opposite the first recess 19 is a first retracting mechanism 24. The first retracting mechanism 24 selectively retracts the first cord 12 when the first connector 14 is not connected to an AC power outlet. The first retracting mechanism 24 is a conventional retracting mechanism which is known in the art.

The housing 18 also includes a second channel 22 through which the second cord 13 extends along the length thereof. At one end of the second channel 22 is a second recess 21 which extends through the housing 18. The second cord 12 further extends through the second recess 21 outwardly from the housing. Positioned at the end of the second channel 22 opposite the second recess 21 is a second retracting mechanism 26. The second retracting mechanism 24 selectively retracts the second cord 12 when the second connector 16 is not connected to an electronic device. Similarly to the first retracting mechanism 24, the second retracting mechanism 26 is a conventional retracting mechanism which is known in the art.

Alternatively, the power source 10 of the present invention could merely include the first and second cords 12 and 13 respectively, wherein each cord extends outwardly from the their respective recess 19, 21 and has a fixed length. Also, the power source 10 of the present invention may include only a single retracting mechanism 24 or 26 for retracting a either the first cord 12 or the second cord 13.

Figure 3:
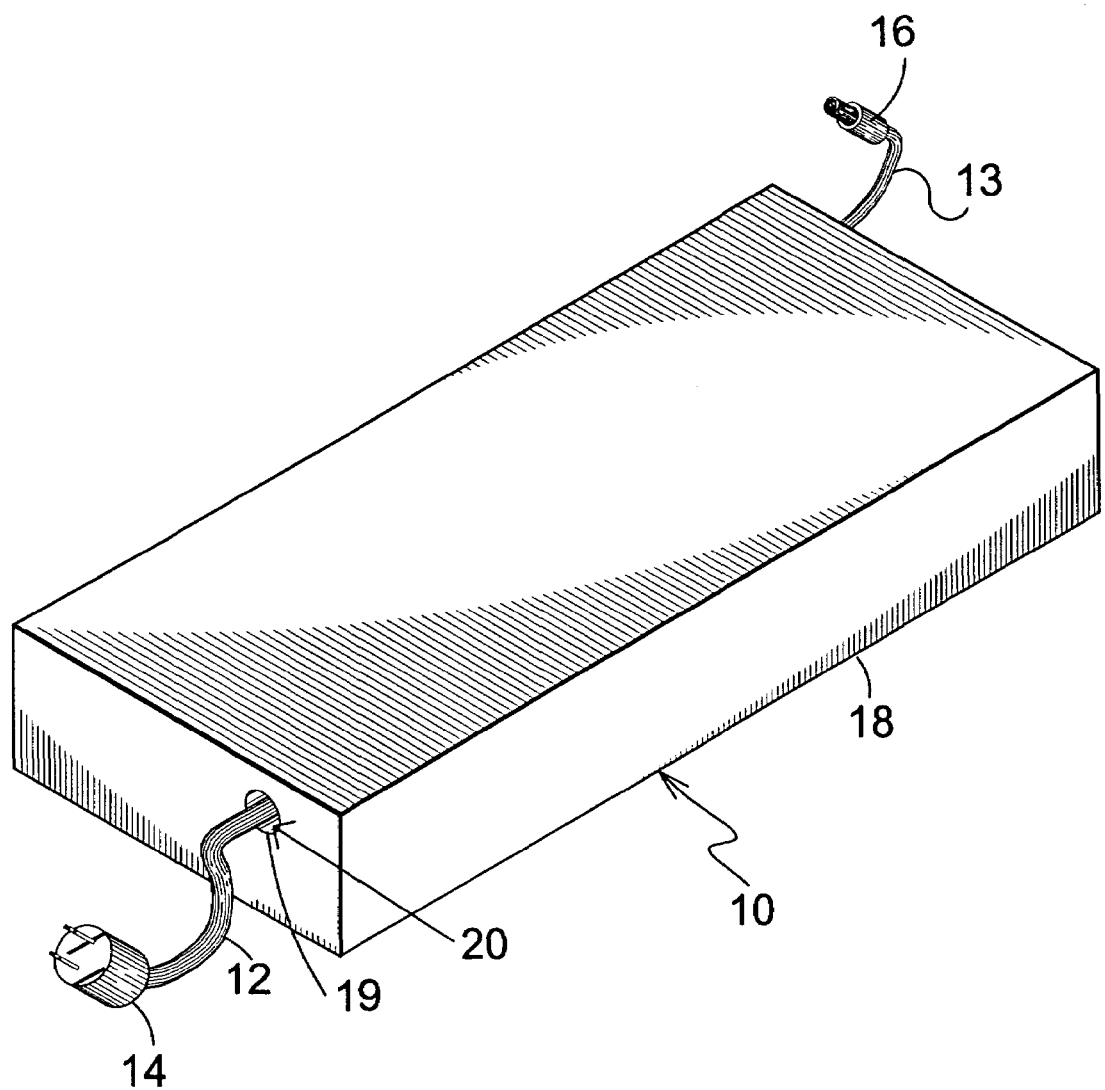
FIG. 3 is a perspective view of the left side of the power source of the present invention showing a plug for connecting to an AC power source.

FIG. 3 is a perspective view of the left side of the power source of the present invention showing a plug for connecting to an AC power source. The power source 10 includes the housing 18. The first cord 12 having the first connector 14 positioned at a distal end thereof extends from the housing 18. Preferably, the first connector 14 is an AC power adapter for insertion into a standard AC power outlet. The power source 10 further includes the second cord 13 having the second connector 16 positioned at a distal end thereof extending from the housing 18. The second connector 16 is a standard plug that is able to be received by an electronic device that requires power. Additionally, the present invention may include a plurality of adapters (not shown) further connected to the second connector 16 so as to enable the power source 10 to be selectively connected to any electronic device requiring an external power source. Furthermore, the cords 12, 13 having connectors 14 and 16 respectively, are described for purposes of example only and either cord may have either connector positioned at a distal end thereof.

The housing includes a first channel 20 through which the first cord 12 extends along the length thereof. At one end of the first channel 20 is a first recess 19 which extends through the housing 18. The first cord 12 further extends through the first recess 19 outwardly from the housing. Positioned at the end of the first channel 20 opposite the first recess 19 is a first retracting mechanism 24. The first retracting mechanism 24 selectively retracts the first cord 12 when the first connector 14 is not connected to an AC power outlet. The first retracting mechanism 24 is a conventional retracting mechanism which is known in the art.

Figure 4:
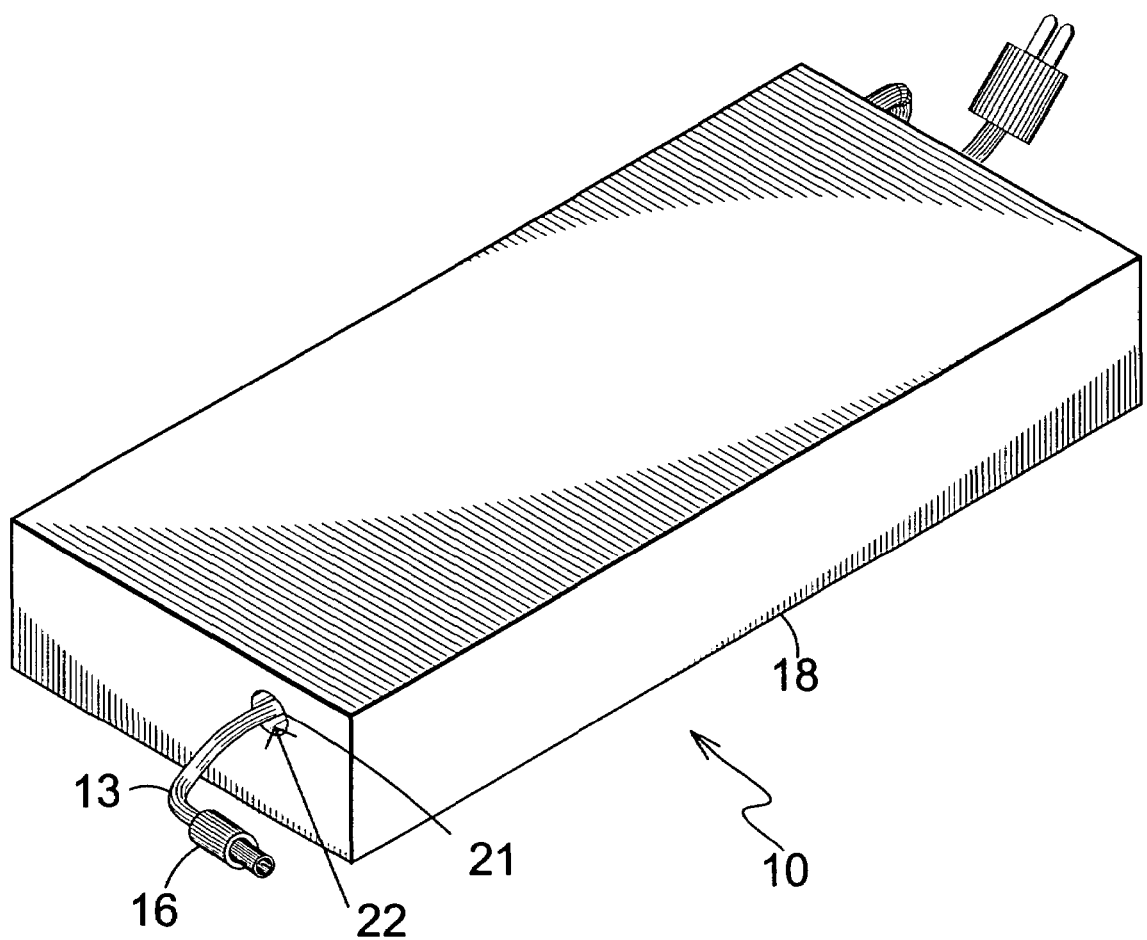
FIG. 4 is a perspective view of the right side of the power source of the present invention showing a connector for connecting the power source to an electronic device.

FIG. 4 is a perspective view of the right side of the power source of the present invention showing a connector for connecting the power source to an electronic device. The power source 10 includes the housing 18. The first cord 12 having the first connector 14 positioned at a distal end thereof extends from the housing 18. Preferably, the first connector 14 is an AC power adapter for insertion into a standard AC power outlet. The power source 10 further includes the second cord 13 having the second connector 16 positioned at a distal end thereof extending from the housing 18. The second connector 16 is a standard plug that is able to be received by an electronic device that requires power. Additionally, the present invention may include a plurality of adapters (not shown) further connected to the second connector 16 so as to enable the power source 10 to be selectively connected to any electronic device requiring an external power source. Furthermore, the cords 12, 13 having connectors 14 and 16 respectively, are described for purposes of example only and either cord may have either connector positioned at a distal end thereof.

The housing 18 also includes a second channel 22 through which the second cord 13 extends along the length thereof. At one end of the second channel 22 is a second recess 21 which extends through the housing 18. The second cord 12 further extends through the second recess 21 outwardly from the housing. Positioned at the end of the second channel 22 opposite the second recess 21 is a second retracting mechanism 26. The second retracting mechanism 24 selectively retracts the second cord 12 when the second connector 16 is not connected to an electronic device. Similarly to the first retracting mechanism 24, the second retracting mechanism 26 is a conventional retracting mechanism which is known in the art.

Figure 5:
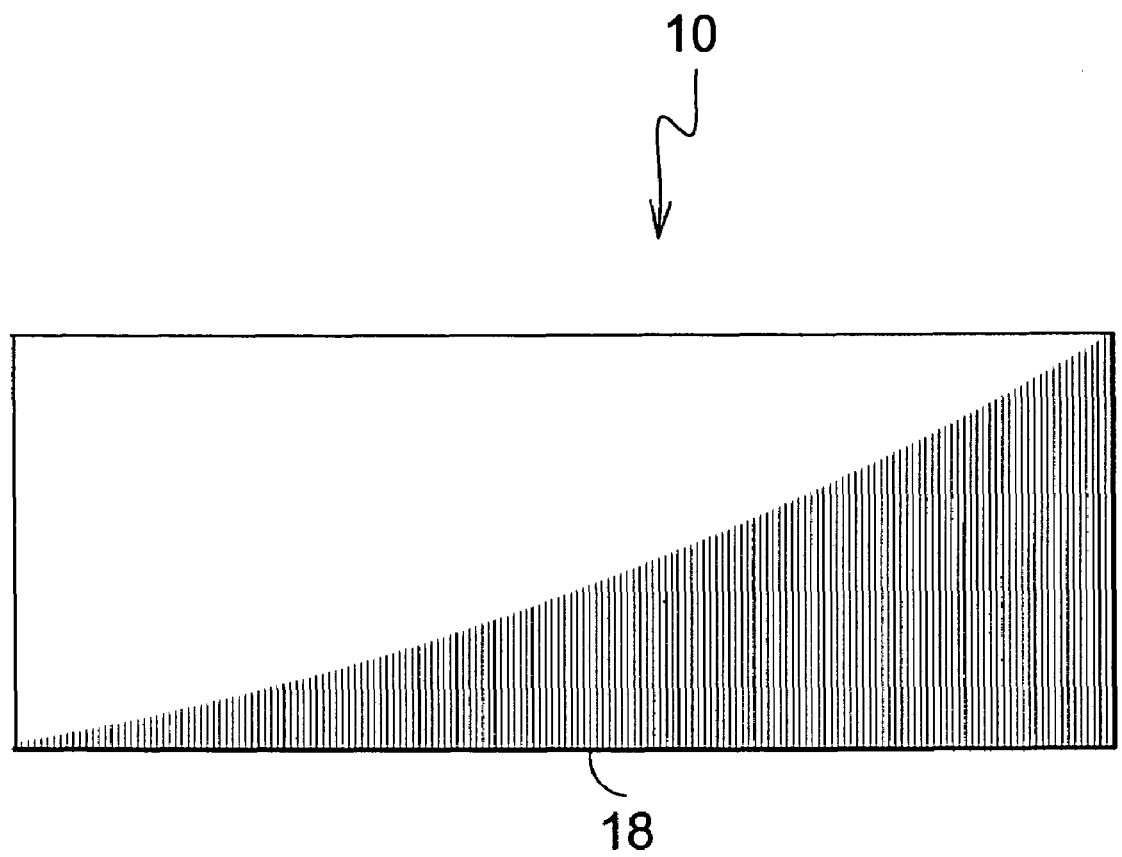
FIG. 5 is a top view of the power source of the present invention with the cords in a retracted position.

FIG. 5 is a top view of the power source of the present invention with the cords in a retracted position. The power source 10 includes the housing 18. The first cord 12 having the first connector 14 positioned at a distal end thereof extends from the housing 18. Preferably, the first connector 14 is an AC power adapter for insertion into a standard AC power outlet. The power source 10 further includes the second cord 13 having the second connector 16 positioned at a distal end thereof extending from the housing 18. The second connector 16 is a standard plug that is able to be received by an electronic device that requires power. Additionally, the present invention may include a plurality of adapters (not shown) further connected to the second connector 16 so as to enable the power source 10 to be selectively connected to any electronic device requiring an external power source. Furthermore, the cords 12, 13 having connectors 14 and 16 respectively, are described for purposes of example only and either cord may have either connector positioned at a distal end thereof.

As shown in FIG. 2, the housing includes a first channel 20 through which the first cord 12 extends along the length thereof. At one end of the first channel 20 is a first recess 19 which extends through the housing 18. The first cord 12 further extends through the first recess 19 outwardly from the housing. Positioned at the end of the first channel 20 opposite the first recess 19 is a first retracting mechanism 24. The first retracting mechanism 24 selectively retracts the first cord 12 when the first connector 14 is not connected to an AC power outlet. The first retracting mechanism 24 is a conventional retracting mechanism which is known in the art.

The housing 18 also includes a second channel 22 through which the second cord 13 extends along the length thereof. At one end of the second channel 22 is a second recess 21 which extends through the housing 18. The second cord 12 further extends through the second recess 21 outwardly from the housing. Positioned at the end of the second channel 22 opposite the second recess 21 is a second retracting mechanism 26. The second retracting mechanism 24 selectively retracts the second cord 12 when the second connector 16 is not connected to an electronic device. Similarly to the first retracting mechanism 24, the second retracting mechanism 26 is a conventional retracting mechanism which is known in the art.

FIG. 5 shows both the first cord 12 and the second cord 13 completely retracted within the housing 18. When the power source 10 of the present invention is not in use, the user retracts the cords in order to have a compact and easily stored or transportable power source. When the power source 10 is transported, the user can selectively release the retracted second cord 13 and connect the second connector 16 to an electronic device that needs an external power source. When the user is finished using the external device, the second cord 13 can be retracted once again thereby leaving the power source as shown in FIG. 5.

Figure 6:
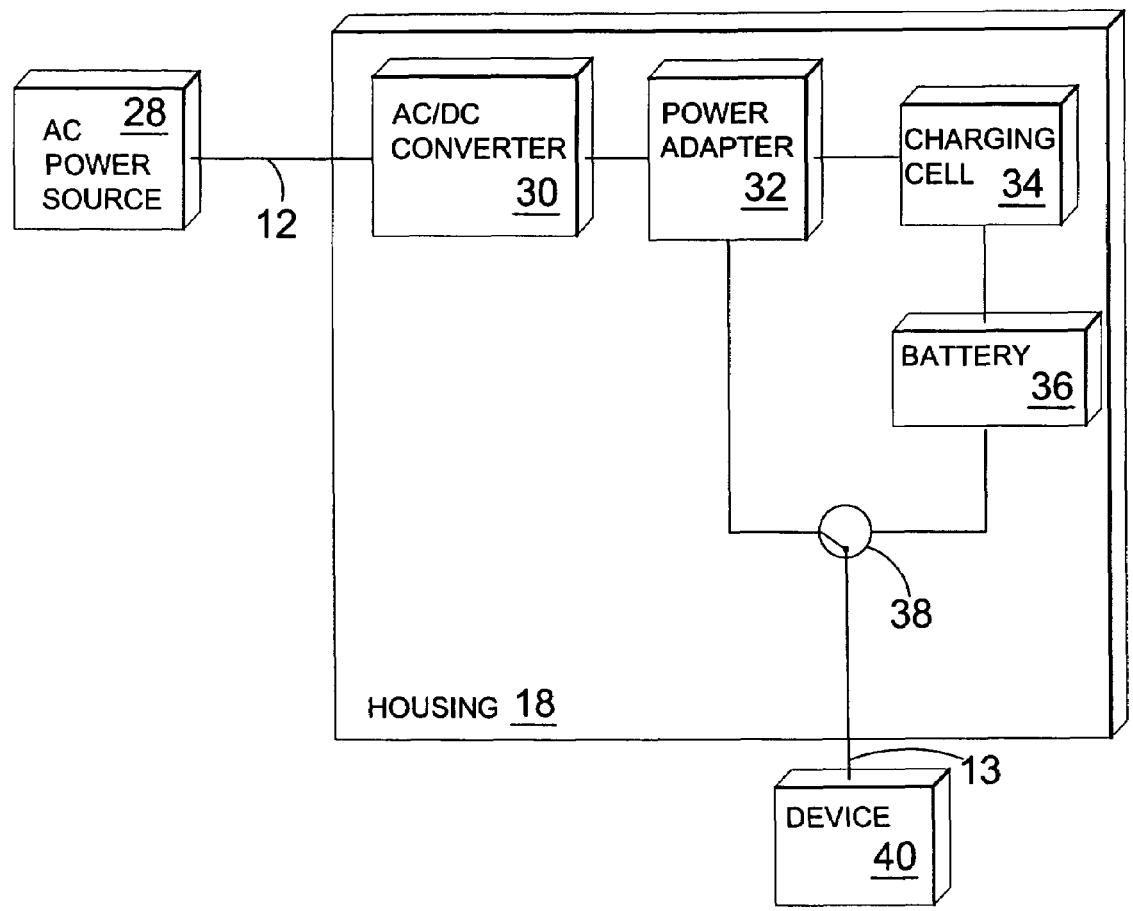
FIG. 6 is a block diagram of the power source of the present invention connected to an external AC power source.

FIG. 6 is a block diagram of the power source 10 of the present invention connected to an external AC power source 28. Preferably, the AC power source is a wall outlet in which the first connector 14 is plugged into. Positioned within the housing 18 is an AC/DC converter 30 for converting alternating current to direct current. The AC/DC converter is connected to a power adapter 32. The power source further includes a charging cell 34 which is connected to the power adapter 32. The charging cell 34 is further connected to a battery 36. Both the power adapter 32 and the battery 36 are connected to the second cord 13 via a sensor switch 38. The sensor switch 38 selectively determines the source from which the external device 40 connected by the second connector 16 to the second cord 13 receives power.

As shown in FIG. 6, the first connector 14 is connected to the AC power source 28. The AC power source 28 provides power to the power adapter 32. The sensor switch 38 detects that the power is being provided by the AC power source and is in a first position. Upon the sensor switch 38 being in a first position, the power adapter 32 provides power through the second cord 13, further though the second connector 16 in order to power the device 40. Additionally, while power is being provided to the device 40, the power adapter 32 provides power to the charging cell 34 which charges the battery 36.

Figure 7:
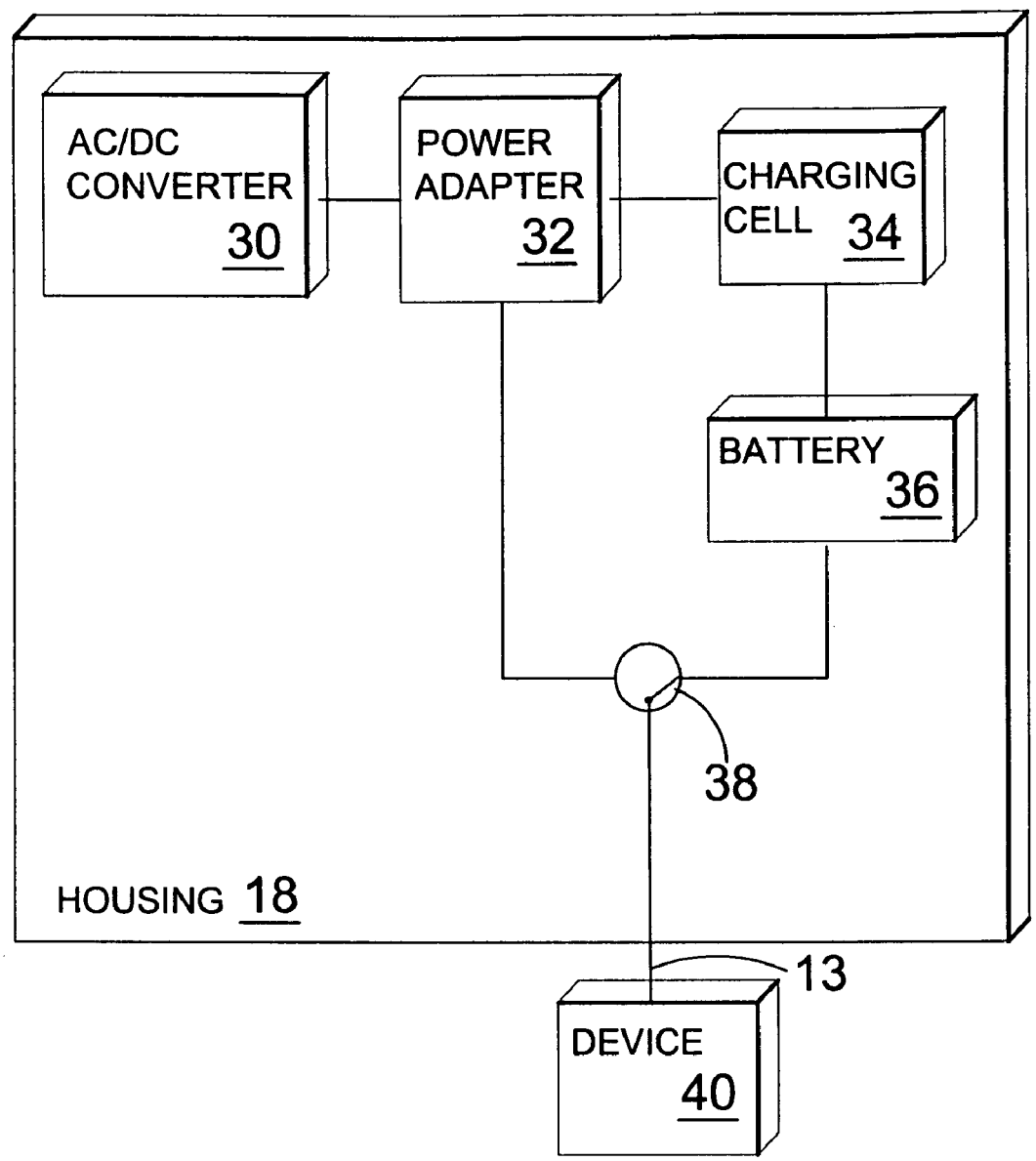
FIG. 7 is a block diagram of the power source of the present invention using power stored in the rechargeable power cell to provide power to an electronic device.

FIG. 7 is a block diagram of the power source of the present invention using power stored in the rechargeable power cell to provide power to an electronic device. Positioned within the housing 18 is an AC/DC converter 30 for converting alternating current to direct current. The AC/DC converter is connected to a power adapter 32. The power source further includes a charging cell 34 which is connected to the power adapter 32. The charging cell 34 is further connected to a battery 36. Both the power adapter 32 and the battery 36 are connected to the second cord 13 via a sensor switch 38. The sensor switch 38 selectively determines the source from which the external device 40 connected by the second connector 16 to the second cord 13 receives power.

As shown in FIG. 7, the power source 10 of the present invention is not connected to the AC power source 28 as shown in FIG. 6. Therefore, the sensor switch 38 detects that no external AC power is provided and moves from a first position to a second position. Upon the switch moving from the first position to the second position, the device 40 connected to the power source 10 via the second connector 16 is powered by the battery 36. The power source 10 of the present invention successfully provides power to any external device 40 connected thereto. Additionally, the power source 10, despite not being connected to an AC power source 28, can provide a sufficient level of power in order any battery contained within the device 40 could be charged as well.

Figure 8:
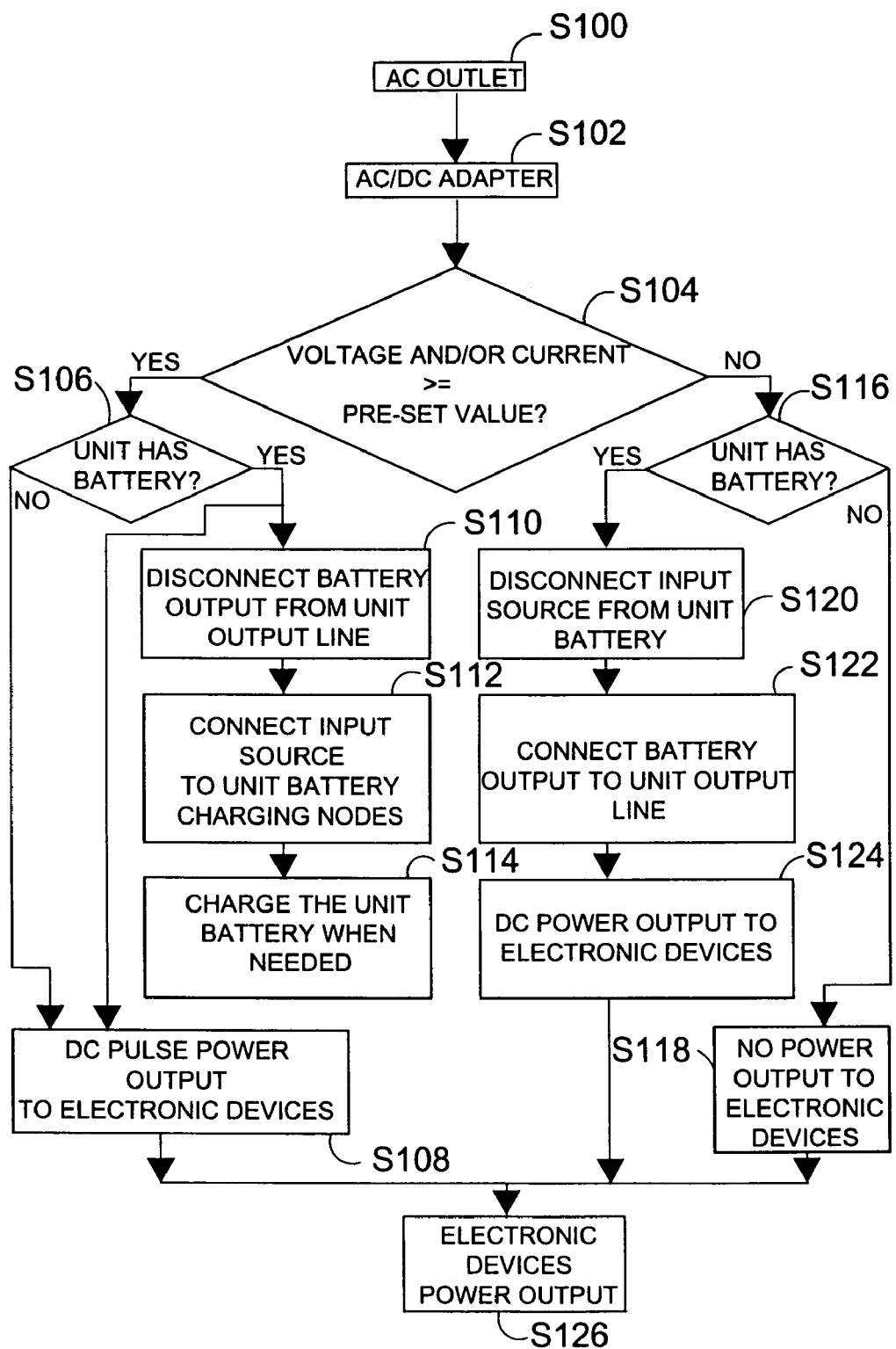
FIG. 8 is flowchart of the power source of the present invention detailing how power from an external AC power source is used in powering an electronic device and charging the rechargeable power cell.

FIG. 8 is flowchart of the power source of the present invention detailing how power from an external AC power source is used in powering an electronic device and charging the rechargeable power cell. The first connecter 14 of the power source 10 is selectively connected to the AC outlet as stated in step S100. The AC current is converted into DC current by the AC-DC converter as in step S102. Thereafter, the sensor switch 38 determines if the voltage/current is greater than or equal to a pre-determined value. If the determination made in step S104 is greater than the predetermined value step S106 determines whether or not the power source 10 includes a battery. If the power source 10 does not have a battery, then the DC pulse power is output to an electronic device 40 as in step S108 and the device is powered as in step S126.

Returning to the inquiry of step S106, if the power source 10 includes a battery, then the battery is disconnected from an output line as in step S110. A power adapter is then connected to a charging cell as in step S112. Thereafter, the battery is charged by the charging cell as in step S14. Additionally, if the power source 10 does have a battery determined by step S106, the DC pulse power is output to electronic devices as in step S108 and the electronic device is powered as in step S126.

If it is determined in step S104 that the voltage/current is not greater than a predetermined value, then an inquiry as to whether or not the power source 10 includes a battery as in step S116. If the power source 10 does not have a battery, then step S118 shows that no power is provided to any device connected to the power source 10. If the outcome of the inquiry in step S116 is that the power source 10 includes a battery, then the charging cell is disconnected from battery in step S120. An output from the battery is then connected to an output line in step S122. Power is then provided via the output line to an electronic device as in step S124. Thereafter, the electronic device connected to the output line receives power as in step S126.

Figure 9:
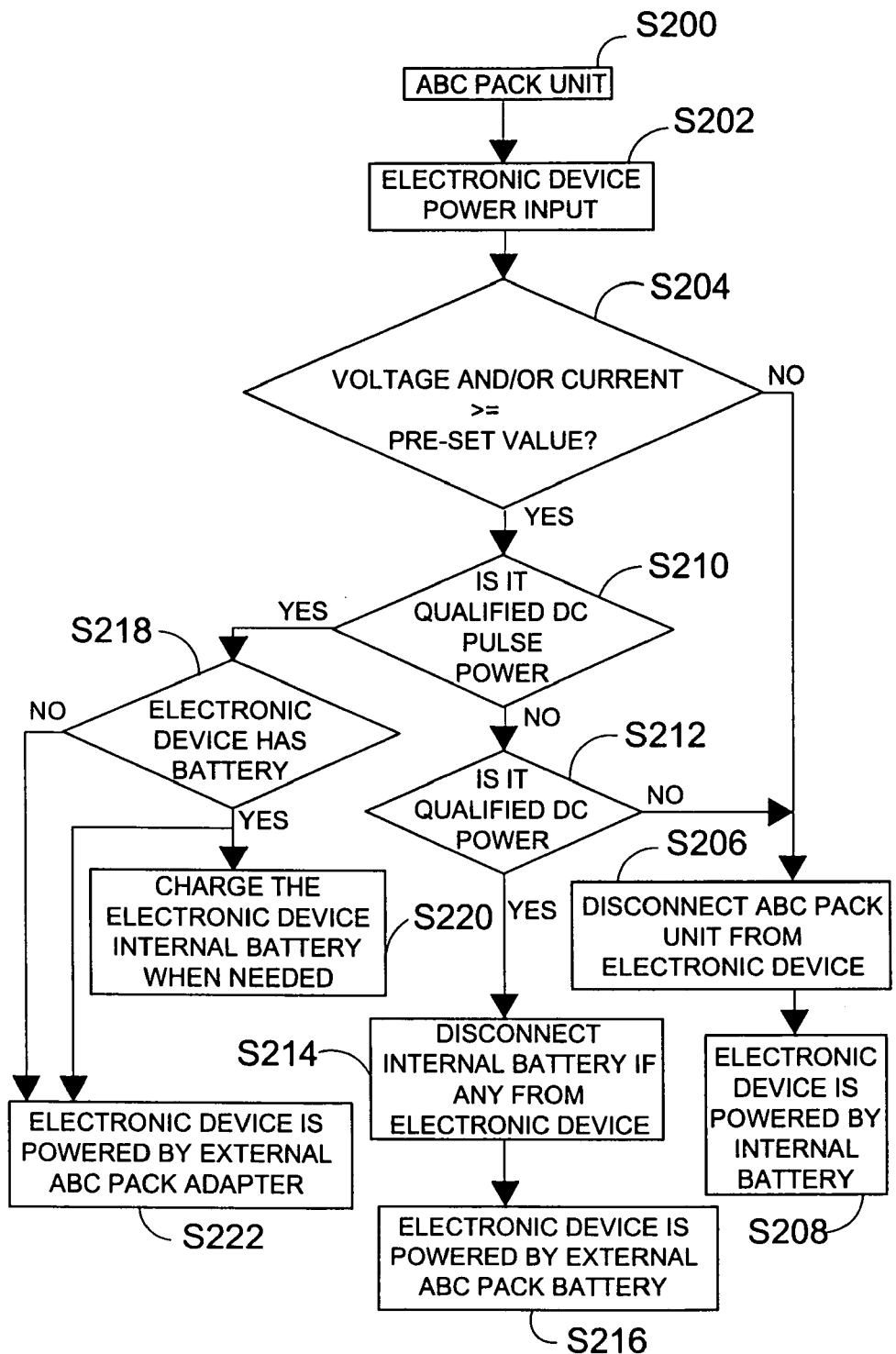
FIG. 9 is flowchart of the power source of the present invention detailing how power stored in the rechargeable power cell is used to power an electronic device.

FIG. 9 is flowchart of the power source of the present invention detailing how power stored in the rechargeable power cell is used to power an electronic device. The power source 10 of the present invention as shown in step S200, is connected to an electronic device as in step S202. Step S204 determines whether or not the voltage/current is greater than a pre-determined value. If the voltage/current is not greater than the pre-determined value then the device is disconnected from the power source 10 as in step S206 and the electronic device is powered by its own internal battery as in step S208.

If the voltage/current determined in step S204 is greater than the pre-determined value then a determination as to whether or not voltage/current is qualified pulse power. If the power is not qualified pulse power, then a determination is made as to whether or not the power is qualified DC power as in step S212. If the power is not qualified DC power then the electronic device is disconnected from the power source as discussed above in step S206 and the device would need to be powered by the internal unit battery as in step S208. If the power is qualified DC power then the internal battery of the electronic device is disconnected as in step S214 and the electronic device is powered by the power source 10 as in step S216.

If the result of the inquiry of step S210 determines that there is qualified pulse power, then step S218 determines if the electronic device has in internal battery. If the device does not have an internal battery then the power is provided to the electronic device as in step S222. If the device does have a battery then the internal battery is charged by the power source as in step S220. While the battery is being charged in step S220, the power source simultaneously provides power to the electronic device as in step 222.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A power source comprising:
   a) a unit comprising a rectangular housing containing an AC/DC converter, a power adapter, a charging cell, a battery and a sensor switch for delivering DC to an electronic device, said unit having a unit input power line and a unit output power line;
   b) said unit input power line comprising a first power cord extending from said housing, said first power cord having a first connector positioned at a distal end thereof for selective connection to an AC external power source;
   c) said unit output power line comprising a second power cord extending from said housing, said second power cord having a second connector positioned at a distal end thereof for selective connection to and for delivering DC power to an electronic device;
   d) said sensor switch having an output position connected to said second power cord for delivering power to said electronic device;
   e) said sensor switch having an input position connected to said power adapter for determining if a voltage/current produced by said power adapter is greater than or equal to a pre-determined value f) said sensor switch having means for delivering DC output directly from said power adapter to said electronic device upon said sensor switch determining that the voltage/current produced by said power adapter is greater than or equal to said predetermined value, disconnecting the unit battery from the sensor switch output position and connecting the charging cell to unit battery charging nodes for charging the unit battery when needed;

g) said sensor switch having means for delivering the DC output from the unit battery to said electronic device upon said sensor switch determining that the voltage/current produced by said power adapter is less than said predetermined value and only if a battery is present;

h) said sensor switch having two positions, one for delivering DC power output directly from said power adapter and a second for delivering DC power from said unit battery;

i) a first retracting mechanism connected within said housing connected to a first end of said first power cord for selectively retracting said first power cord when said first power cord is not connected to the external power source;

j) a second retracting mechanism contained within said housing connected to a first of said second power cord for selectively retracting said second power cord when said second power cord is not connected to the electronic device; and k) said first and second power cords entering said housing from opposite ends of said housing passing through channels to said first and second retracting mechanisms, and the first and second retracting mechanisms located at opposite ends of said housing with said second retracting mechanism being adjacent said first end of said first power cord and said first retracting mechanism being adjacent the first end of said second power cord, and said channels being parallel to each other.

2. The power source as recited in claim 1, wherein said first connector is a plug for receipt within a standard AC power outlet.

* * * * *